US012228687B2

(12) United States Patent
Zimmerman (10) Patent No.: US 12,228,687 B2
(45) Date of Patent: Feb. 18, 2025

(54) SONAR TRANSDUCER MODULE WITH INTEGRATED PROTECTION

(71) Applicant: FarSounder, Inc., Warwick, RI (US)

(72) Inventor: Matthew Zimmerman, North Kingstown, RI (US)

(73) Assignee: FarSounder, Inc., Warwick, RI (US)

( * ) Notice: Subject to any disclaimer, the term of this patent is extended or adjusted under 35 U.S.C. 154(b) by 174 days.

(21) Appl. No.: 17/633,023

(22) PCT Filed: Aug. 20, 2020

(86) PCT No.: PCT/US2020/047146
§ 371 (c)(1),
(2) Date: Feb. 4, 2022

(87) PCT Pub. No.: WO2021/035022
PCT Pub. Date: Feb. 25, 2021

(65) Prior Publication Data
US 2022/0276362 A1    Sep. 1, 2022

Related U.S. Application Data

(60) Provisional application No. 62/890,337, filed on Aug. 22, 2019.

(51) Int. Cl.
*G01S 7/521*    (2006.01)
(52) U.S. Cl.
CPC .................. *G01S 7/521* (2013.01)
(58) Field of Classification Search
CPC ...................................................... G01S 7/521
See application file for complete search history.

(56) References Cited

U.S. PATENT DOCUMENTS 5,047,996 A * 9/1991 Armiger .............. G10K 11/008
367/173
2007/0064538 A1 3/2007 Jefree et al.
(Continued)

OTHER PUBLICATIONS

"Peter H. Mot, Acoustic and dynamic mechanical properties of a polyurethane rubber, Jun. 13, 2001, Journal of the Acoustical Society of America vol. 111, No. 4, pp. 1782-1790; section F, Sound speed data analysis & section IV, Conclusions" (Year: 2020).*
(Continued)

*Primary Examiner* — Isam A Alsomiri
*Assistant Examiner* — Abdallah Abulaban
(74) *Attorney, Agent, or Firm* — Sullivan & Worcester LLP; Zachary D. Hyde (57) ABSTRACT

The present invention is directed to a transducer module including a two-piece protective assembly offering mechanical protection for one or more transducer elements (i.e., transmitter(s) and/or receiver(s)) provided within. The two-piece protective assembly comprises an internal rigid housing including a cavity formed by a set of walls or projections extending from a rear portion thereof. The cavity is shaped and/or sized to receive the one or more transducer elements within. The two-piece protective assembly further includes a cover overmolded and coupled to the rigid housing and sealing the one or more transducer elements within the cavity of the housing.

18 Claims, 8 Drawing Sheets

(56) References Cited

U.S. PATENT DOCUMENTS

| | | | |
|---|---|---|---|
| 2013/0169112 A1* | 7/2013 | Seo | A61B 8/4494 |
| | | | 29/25.35 |
| 2014/0160753 A1* | 6/2014 | Stroumbas | H05B 45/00 |
| | | | 362/335 |
| 2015/0294660 A1 | 10/2015 | Stokes | |
| 2015/0369908 A1 | 12/2015 | Zimmerman et al. | |
| 2016/0341827 A1 | 11/2016 | Horner et al. | |
| 2017/0059705 A1* | 3/2017 | Stokes | G01S 7/521 |
| 2020/0116843 A1 | 4/2020 | Zimmerman et al. | |

OTHER PUBLICATIONS

Int Search Report and Written Op mailed Nov. 9, 2020, for Int Application No. PCT/US2020/47146, filed Aug. 20, 2020 (14 pages).

Mott, 2002, Acoustic and dynamic mechanical properties of a polyurethane rubber, Journal of the Acoustical Society of America, 111(4):1782-1790.

\* cited by examiner

SONAR TRANSDUCER MODULE WITH INTEGRATED PROTECTION

TECHNICAL FIELD

The invention generally relates to sonar arrays, and, more particularly, to a sonar transducer module including integrated mechanical protection.

BACKGROUND

Systems employing underwater acoustics are commonly found on a variety of marine vessels (e.g., container ships, tanker ships, passenger ships, yachts, sailboats, etc.). Such systems are also deployed in a variety of other underwater systems, including, but not limited to, sea floor mounted installations, mooring mounted installations, and diver-held installations. The most common underwater acoustic systems are known as echosounders. An echosounder is a device which uses sonar (SOund Navigation And Ranging) technology for the measurement of underwater physical and biological components. Echosounders may be used to determine depth and bottom topography, detect fish, locate wreckage, etc.

Echosounders include a component colloquially known as a "transducer". A transducer is generally understood to refer to the actual electronic mechanism to convert energy from one form to another. However, the colloquial term "transducer" or "transducer module" generally refers to the entire package that is exposed to the water and includes, at minimum, the mechanism for converting electrical energy to acoustic energy and vice versa (i.e., the transducting mechanism) and the mechanism for mounting the transducting mechanism to the platform. A sonar sound beam is transmitted into and through the water and is reflected from objects it encounters. The transducting mechanism receives the reflected sound (the "sonar returns") and converts the sound energy into electrical energy. Based on the known or estimated speed of sound, it is possible to determine the distance to and/or location of the waterborne or underwater objects. The sonar return signals can also be processed to be displayed on a display device, giving the user a "picture" of the underwater environment.

Due to the fragility of the transducting mechanism, manufacturers have attempted to provide some means protection, typically from impact forces (i.e., impact with onboard equipment, such as the anchor chain or cable, or other elements, such as rocks, icebergs, other vessels, docks, etc.). For example, some transducers include an acoustically transparent cover provided over the transducer module, in which a void therebetween is filled with oil. While this arrangement provides some protection, the cover can negatively impact performance as a result of refraction encountered during operation of the transducer module.

Another form of protection includes placing an external protective feature around the transducer module. For example, in some instances the transducer module is disposed inside a metal cup. Unfortunately, transducer modules often have complicated shapes that are difficult to seal inside external protective features without leaking.

Yet another form of protection includes recessing the transducer module into a structure of vessel, such that the structure vessel provides some mechanical protection to the transducer module. This form of protection, however, is limited based on the overall architecture and design of the vessel. In particular, it is difficult to provide adequate protection without impacting the vessel's hydrodynamics, particularly in instances in which the transducer module has a complicated shape. As such, the design of the vessel modification is often developed on a case-by-case basis by the vessel operator with little or no oversight by the transducer module manufacturer. Such variation and lack of oversight can lead to designs that do not offer the protection needed.

SUMMARY

The present invention provides a transducer module with integrated protection. The transducer module includes a two-piece protective assembly offering mechanical protection for one or more transducer elements (i.e., transmitter(s) and/or receiver(s)) provided within. The two-piece protective assembly includes a housing comprised of a rigid material and including a cavity formed by a set of walls or projections extending from a rear portion of the housing. The cavity is shaped and/or sized to receive the one or more transducer elements within. For example, the set of walls may generally include two or more walls, arranged in such a manner so as to enclose respective portions of the one or more transducer elements within while remaining outside of a field of view of the transducer elements (i.e., not obstruct acoustic beams or receipt of reflected beams). The transducer elements are sealed inside the housing by a cover. The cover protects the transducer elements against surrounding liquids (e.g., water or oil) while allowing acoustic beams to pass therethrough. Preferably, the cover is a polymer, such as, urethane, with an acoustic impedance that is similar to water. The cover may be molded over the walls or projections that define the cavity to provide optimal binding of the cover with the housing, thereby maximizing protection of the transducer elements by tightly sealing the transducer elements within the housing.

It should be noted that the set of walls may include any number of walls depending on the level of protection desired and the anticipated impact forces to be encountered. For example, in some embodiments, a given transducer module may only encounter side and/or front-facing impacts due to the location of its placement on the vessel and/or the type of activity with which the given vessel is associated with. Accordingly, in such an embodiment, the housing may only include two side walls to thereby provide protection for side and/or front-facing impacts. In other embodiments, a given transducer module may only encounter top and/or bottom impacts, and, as such the housing may only include top and bottom walls to provide corresponding protection. Yet still, in other embodiments, a given transducer module may encounter all directions of impact (i.e., side, front facing, top and/or bottom impacts), and, as such the housing may include side, top, and bottom walls to provide corresponding protection.

The two-piece protective assembly further includes a cover overmolded and coupled to the rigid housing and sealing the one or more transducer elements within the cavity of the housing. The cover includes a marine grade material capable of undergoing an overmolding process and curing to a semi-rigid state. The cover material has a resilient nature to thereby reduce or dampen movement or vibration. In one embodiment, the overmolded cover includes urethane, for example.

The transducer module of the present invention addresses the drawbacks of current protection mechanisms. The two-piece protective assembly allows for the transducer module to be a standalone module that does not require a custom recess to be provided in the structure of a vessel. In other words, the transducer module may be a hull-mountable device, configured to be directly mounted to an exterior of a vessel's hull and thus does not rely on the vessel for protection from impacts. Rather, the internal rigid housing can provide protection similar to that of a vessel's structure. Alternatively, in some embodiments, the transducer module may be installed in a recessed manner or a partially recessed manner. One advantage of installing the device in a recessed or partially recessed manner is that the hull and fairing design may provide protection from some directions and the internal protection members can provide protection from other directions.

Furthermore, overmolding the urethane cover allows for improved bonding of urethane to the one or more transducer elements and the housing itself, forming a tight seal and providing protection against multiple directions of impact (i.e., side impacts and front-facing impacts) in cooperation with the internal housing. In particular, the arrangement of the walls or projections of the internal housing reduces the possibility of compressing the urethane and transferring the impact force to the transducer elements.

One aspect of the present disclosure includes a sonar transducer module including an internal housing comprising a cavity defined by a set of walls extending from a rear portion thereof, one or more transducer elements provided within the cavity of the housing, and a cover overmolded and coupled to the internal housing and sealing the one or more transducer elements within the cavity of the internal housing.

The set of walls are arranged to cover respective portions of the one or more transducer elements without obstructing a field of view of the one or more transducer elements. In some embodiments, the set of walls comprises at least two walls. The at least two walls may include opposing side walls or may include opposing top and bottom walls. In other embodiments, the set of walls comprises at least four walls. The at least four walls comprises opposing side walls and opposing top and bottom walls. In such an embodiment, a portion of the cavity defined, at least in part, by the top wall is shaped and/or sized to correspond to a shape of a transmitter transducer element without obstructing a field of view of the transmitter transducer element. In such an embodiment, a portion of the cavity defined, at least in part, by the opposing side walls and bottom wall is shaped and/or sized to correspond to a shape of a receiver transducer element without obstructing a field of view of the receiver transducer element The internal housing comprises a marine grade material. The marine grade material comprises a duplex stainless steel. In some embodiments, the material comprises SAE 316L grade stainless steel.

The cover comprises a marine grade material capable of undergoing an overmolding process. The material may further include an acoustic impedance substantially similar to water. In some embodiments, the cover comprises a polymer. Preferably, the cover comprises a urethane material.

DETAILED DESCRIPTION

By way of overview, the present invention is directed to a transducer module including a two-piece protective assembly offering mechanical protection for one or more transducer elements (i.e., transmitter(s) and/or receiver(s)) provided within.

The two-piece protective assembly includes a housing comprised of a rigid material and including a cavity formed by a set of walls or projections extending from a rear portion of the housing. The cavity is shaped and/or sized to receive the one or more transducer elements within. For example, the set of walls may generally include two or more walls, arranged in such a manner so as to enclose respective portions of the one or more transducer elements within while remaining outside of a field of view of the transducer elements (i.e., not obstruct acoustic beams or receipt of reflected beams). The two-piece protective assembly further includes a cover overmolded and coupled to the rigid housing and sealing the one or more transducer elements within the cavity of the housing. The cover includes a marine grade material capable of undergoing an overmolding process and curing to a semi-rigid state. In one embodiment, the overmolded cover includes urethane, for example.

Transducers rely on elements, such as, transmitters or receivers, that are fragile. Unfortunately, transducers are prone to certain underwater collisions, for example, such as, collisions with anchor chains or cables, or with other elements, such as rocks, icebergs, docks, etc. Those collisions often damage the transducer elements, which can disrupt or eliminate their ability to function. This is especially problematic in the open water because without transducers it is difficult to safely navigate water vessels. For example, without transducers one cannot identify and thus navigate around underwater hazards. To address this issue, this disclosure provides a transducer module with an integrated housing. The housing is designed to protect transducer elements disposed within the housing from impact forces. For example, the housing may comprise rigid walls that absorb the impact forces from collisions and prevent damage to the transducer elements. Preferably, the housing is embedded within a protective material or cover that seals the transducer elements within the housing and protects them from surrounding liquids. For example, the cover may be disposed around the housing via an overmolding process. The overmolding of the cover to the housing results in portions of the cover extending over and surrounding side portions of the housing, in addition to covering and sealing the transducer elements therein. Surrounding side portions of the housing with the cover is desirable because it increases the bonding area between the cover and the housing, thereby securing the cover in place.

The invention uses an integrated housing with a cover that extends over portions of the housing, thereby sealing the housing containing the transducer elements therein. This configuration has particular advantages over certain prior art that protect transducer elements by sealing them inside a cavity of an external housing. In particular, sealing transducer elements inside an external housing (e.g., a metal cup) is inferior because the bonding area between the cover and the cavity of the external housing is limited by the interior surface area of the cavity itself, and as such, is prone to leaking. Conversely, integrating the housing within the protective cover increases the bonding area between the cover and the housing providing a tighter, more impenetrable seal.

Moreover, as discussed, transducer modules often comprise complicated shapes. The complicated shapes of transducer modules when mounted to a vessel can interfere with hydrodynamics by creating drag or turbulence. Hydrodynamic interference negatively impacts the vessel's ability to move through the water by, for example, reducing fuel efficiency or by creating vibrations. One insight of the invention is that because the protective assembly is formed by molding a liquid polymer (e.g., urethane) over a rigid housing, the transducer modules of the present invention may be made to match hydrodynamic requirements of a vessel more easily than can be achieved by a more expensive external housing, as found in the prior art. Accordingly, in some aspects the present invention provides cost-effective transducer modules with improved hydrodynamic performance. And although many conventional marine sonars are installed in a location or manner that can use protection accommodations found in the prior art, our unique products require unique installation locations and have necessitated the present invention.

Figure 1:
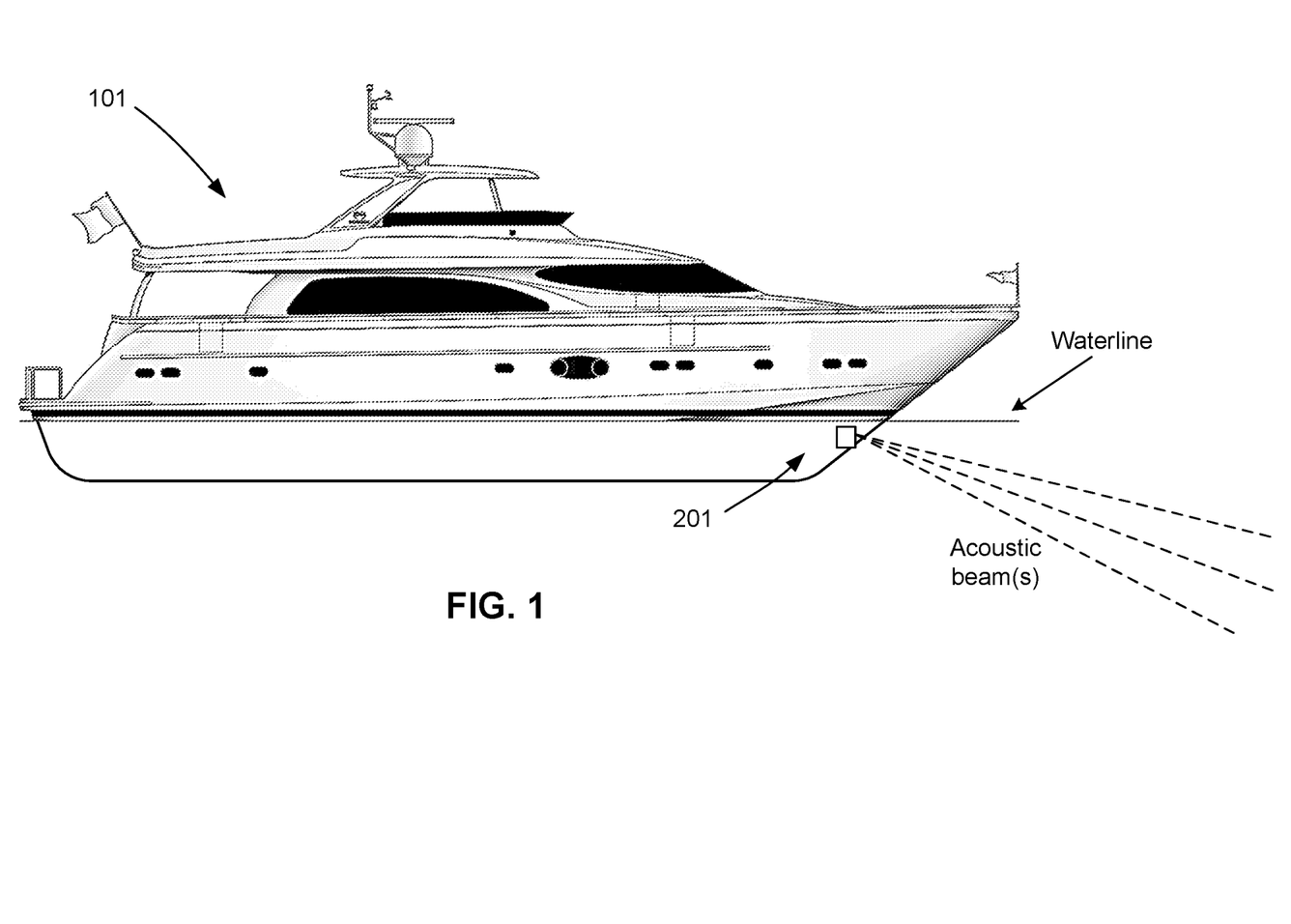
FIG. 1 depicts a marine vessel equipped with a transducer module of the present invention.

FIG. 1 depicts a marine vessel 101 equipped with a transducer module 201 of the present invention. As illustrated, the marine vessel 101 may include a mid-sized yacht (i.e., 18 to 40 meters), for example. However, it should be noted that the transducer module 201 can be used with any marine vessel. The transducer module 201 may include one or more sonar transmit transducer elements and/or one or more sonar receive transducer elements and may optionally include some or all of the sonar processing electronics. It should be noted that the transducer module 201 may include forward-looking sonar capabilities and down-looking capabilities, as described in U.S. Publication Nos. 2020/0116843 to 2015-0369908 to Zimmerman et al., the content of each of which is incorporated by reference herein in its entirety. Accordingly, as illustrated, the transducer module 205 is installed on the bow of the vessel 101 facing forward, at least one meter below the waterline, as the transducer module 205 includes forward-looking capabilities.

Figure 2:
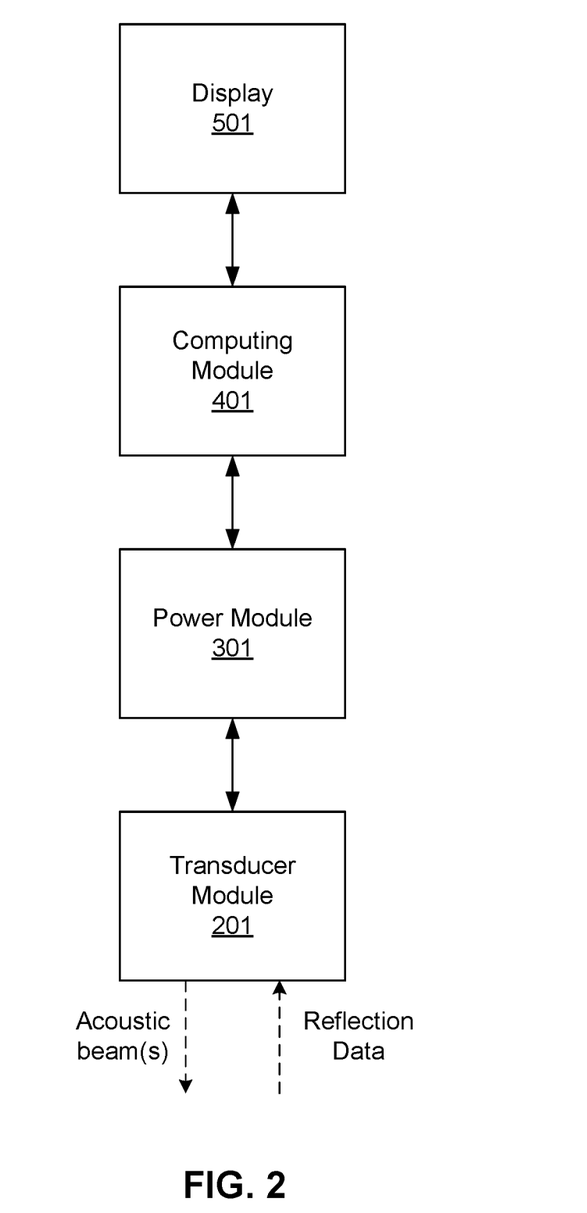
FIG. 2 is a block diagram illustrating an overall sonar system, including the transducer module of the present invention.

FIG. 2 is a block diagram illustrating an overall sonar system, including the transducer module 205. A sonar system with transducer module 201 may be used for a variety of purposes including, for example, seafloor surveys, mine detection, and recreational pursuits such as fishing. The transducer module 205 is connected to a power module 301 using a wet-mateable connector. The power module 301 is coupled to a computing module 401 using any suitable electrical connection for transmitting data streams, such as, for example a standard Cat5E or Cat6 network cable. Finally, the computing module 401 is coupled to a display unit 501, usually provided in the bridge of the vessel, thereby providing sonar data (collected via the transducer module 201.

Figure 3:
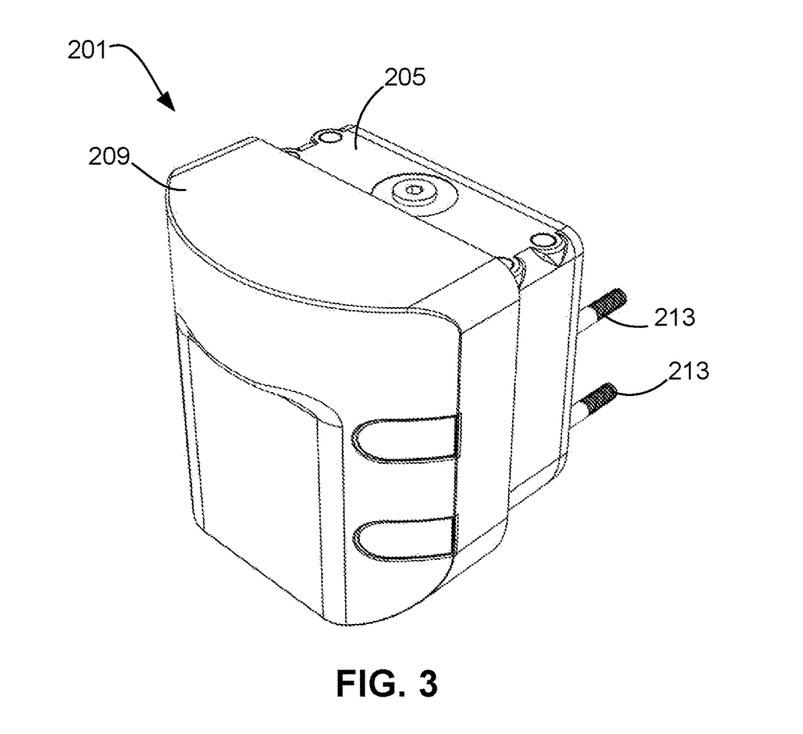
FIG. 3 is a perspective view of a transducer module of the present invention.
Figure 4:
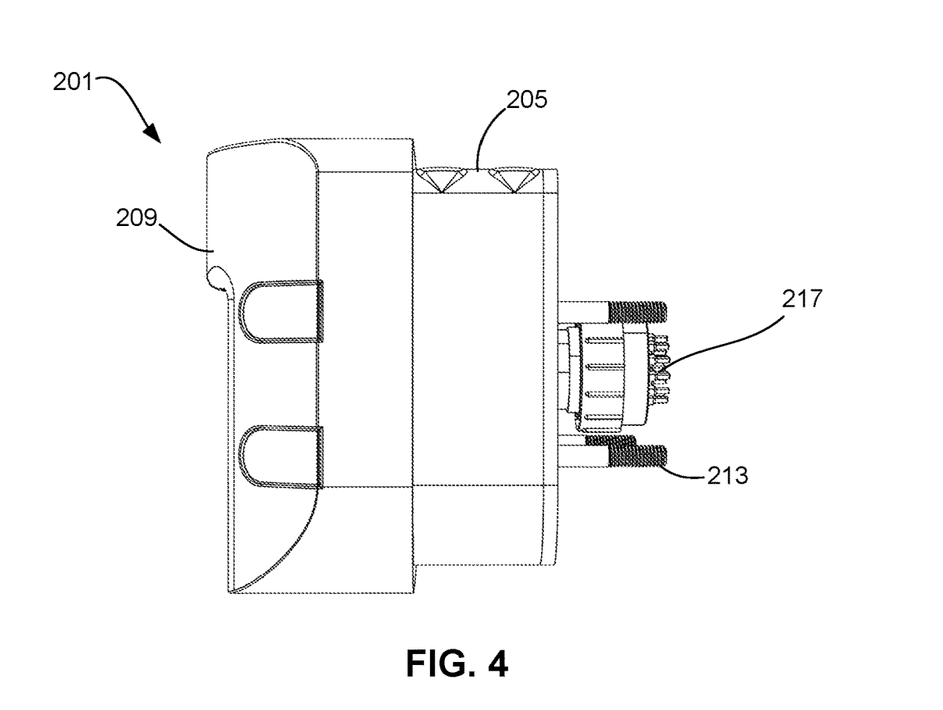
FIG. 4 is a side view of a transducer module of the present invention.

FIG. 3 is a perspective view of a transducer module 201. FIG. 4 is a side view of a transducer module 201. The transducer module 201 includes a two-piece protective assembly including a housing 205 and a cover 209. The housing 205 includes a rigid, marine grade material having anti-corrosive qualities. For example, in one embodiment, the housing 205 includes a metal material, such as a duplex stainless steel. In some embodiments, the housing material includes SAE 316L grade stainless steel (sometimes referred to as A4 stainless steel or marine grade stainless steel). In some embodiments, the housing 205 is cast into its final shape. Casting is a process in which a liquid metal is delivered into a mold that contains a negative impression of the intended shape. The metal is poured into the mold through a hollow channel called a sprue. The metal and mold are then cooled, and the metal part (i.e., the housing) is extracted. Alternatively, the housing 205 may be formed by machining a metal, such as one of 316 or 316L. Machining is any of various processes in which a piece of raw material is cut into a desired final shape and size by a controlled material-removal process.

The cover 209 is coupled to the housing 205 via an overmolding process. Overmolding refers to a method in which a liquid polymer, e.g., urethane, is cast around a pre-placed substrate, i.e., the housing 205, and is molded in place. The liquid polymer molds or solidifies to form a solid, rigid cover 209 with the housing 205 comprising one or more transducer elements embedded therein.

The overmolded cover 209 preferably has a wall thickness sufficient to seal the embedded components from the water and provide mechanical protection, along outer side portions of the housing 205. Moreover, depending on the desired location of the transducer module 201, the liquid polymer (e.g., urethane) may be molded over the housing 205 to create a transducer module 201 that comprises any one of a variety of different shapes (e.g., square, rectangular, circular, oval, rhombus, etc.). Accordingly, the thickness of the molded cover 209 may be uniform, or may vary significantly over one or more portions of the housing 209. In some instances, the liquid polymer may be molded so as to match hydrodynamic requirements of the vessel onto which the transducer module 201 is to be mounted. In some embodiments, the liquid polymer is molded over the housing 205 to create a transducer module 201 that is sized to fit into a pre-formed recess disposed on the vessel.

The overmolding of the cover 209 to the housing 205 results in portions of the cover 209 extending over and surrounding side portions of the housing 205, in addition to covering and sealing one or more transducer elements within the housing 205. The cover 209 includes a marine grade material capable of undergoing an overmolding process and curing to a semi-rigid state. The material is resilient and provides adequate reduction or dampening of movement and/or vibration. In a preferred embodiment, the cover material is urethane. Urethane is a desirable material for this application in that it has an acoustic impedance similar to water and is able to cure to a semi-rigid state similar to rubber, such that its hardness is less the hardness of the internal housing 205.

The transducer module 201 is mountable to a hull of the vessel via mounting screws 213, for example. For example, the housing 205 may include screw or bolt guides for receipt of corresponding screws or bolts, which may then be used to mount the rear portion of the housing directly to the hull of the vessel, preferably the bow (due to the forward looking capabilities of the transducer module 201). Upon being mounted to the hull, the transducer module 201 is coupled to the power module 301 via a wet-mateable connection 217, which is in electrical contact with one or more transducer elements provided within the housing 205 and capable of transmitting data to and from the one or more transducer elements.

Figure 5:
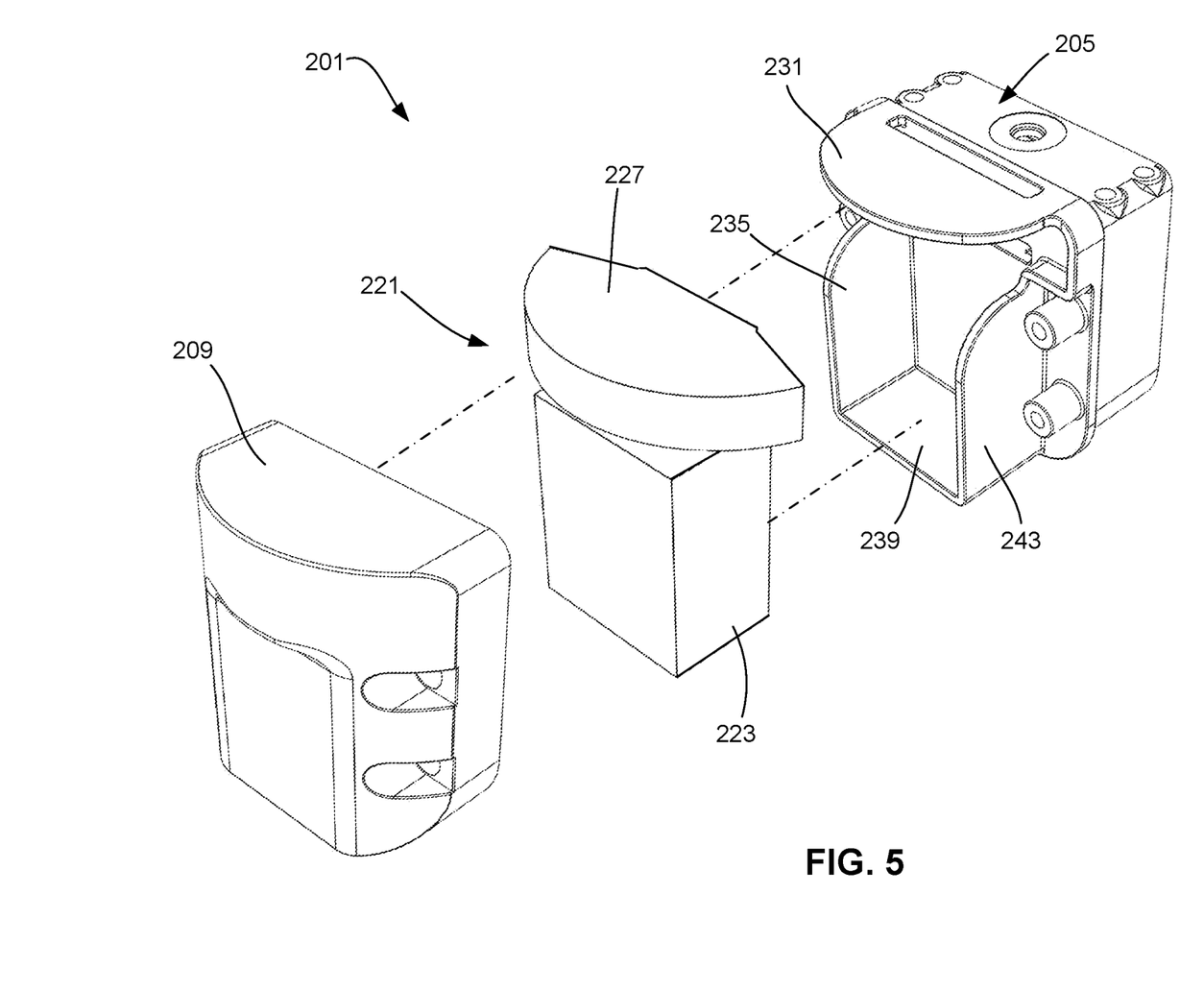
FIG. 5 is an exploded view of a transducer module of the present invention.

FIG. 5 is an exploded view of a transducer module 201. The one or more transducer elements 221 may include, for example, a receiver element 223 (configured to receive reflection data) and a transmitter element 227 (configured to emit acoustic beams). In cases where a multitude of transducer elements 221 are aligned in a particular configuration within the transducer module, this multitude of transducers shall be referred to as a "transducer array". It should be noted that the transducer elements and transducer arrays may operate as a receiver, a transmitter, or both. It should further be noted that, while a single set of a receiver and transmitter are illustrated, transducer arrays may be packaged within a single transducer module. For example, in some embodiments, the transducer may include a multitude of transducer elements 221. The multitude of transducer elements 221 may be mounted in a substantially horizontal coplanar relationship. For example, the transducer elements 221 may be orderly arranged in substantially parallel rows which extend transversely to other substantially parallel rows. The horizontal coplanar relationship may be desirable to help ensure that the transducer elements 221 each receive acoustic signals nearly simultaneously. This may help reduce the complexity of signal processing, thereby allowing for higher signal-to-noise ratios and more rapid scanning.

The housing 205 includes a cavity formed by a set of walls or projections extending from a rear portion of the housing 205. The cavity is shaped and/or sized to receive the one or more transducer elements within. For example, as illustrated, the housing 205 includes a top wall 231, and opposing bottom wall 239, and opposing side walls 235 and 243, to thereby define the cavity. The transmitter 227 generally fits within a portion of the cavity defined at least in part by the top wall 231 and the receive 223 generally fits within a portion of the cavity defined at least in part by the bottom wall 239 and opposing side walls 235 and 243.

Figure 6:
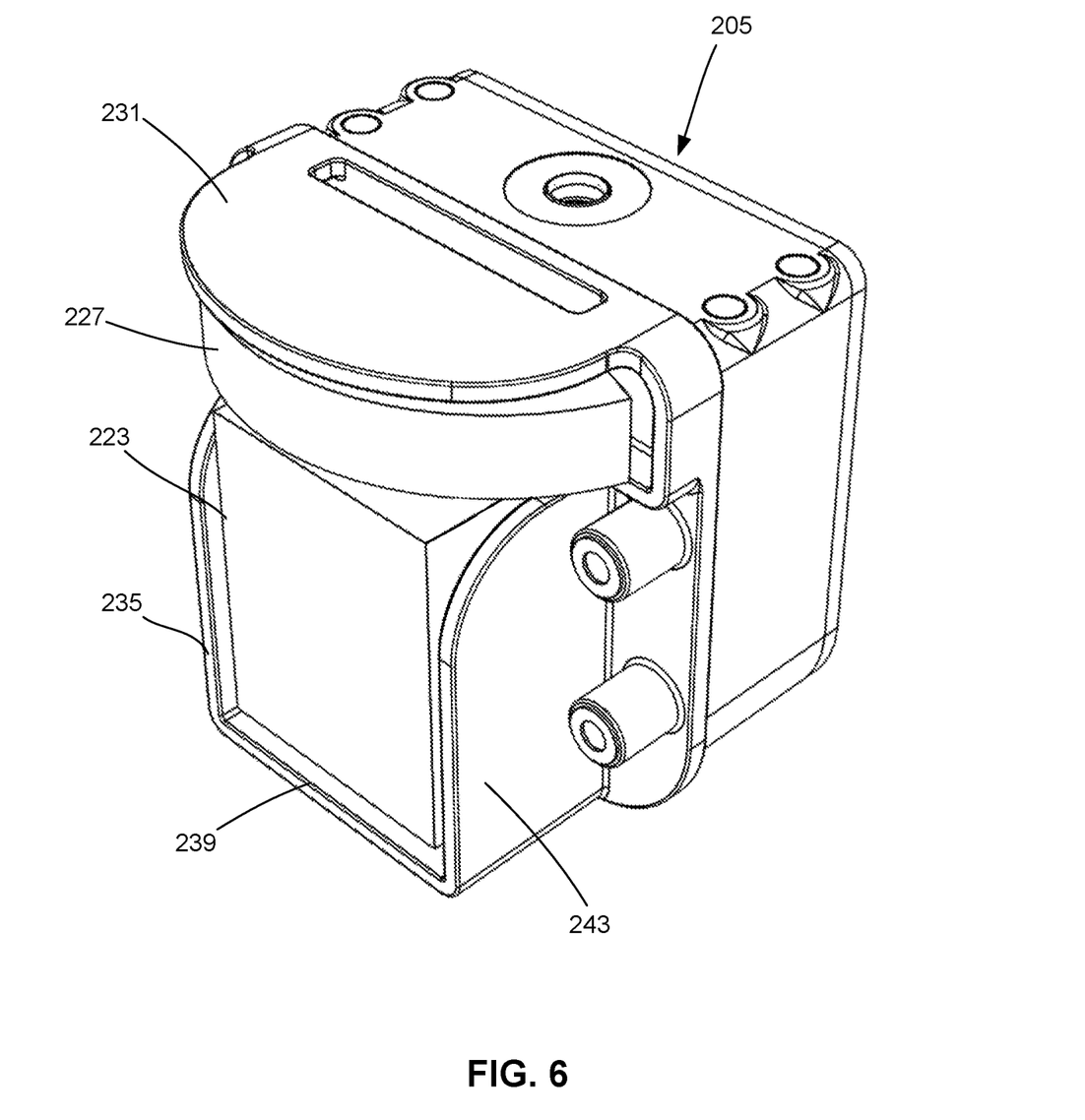
FIG. 6 is a perspective view of transducer elements enclosed within the cavity of the internal housing.

FIG. 6 is a perspective view of transducer elements 221 enclosed within the cavity of the internal housing 205. The walls are arranged in such a manner so as to enclose respective portions of the one or more transducer elements within while remaining outside of a field of view of the transducer elements (i.e., not obstruct acoustic beams or receipt of reflected beams). For example, the top wall 231 has a shape that generally corresponds to a shape of the transmitter 227 (i.e., arcuate shape or profile). Similarly, the bottom wall 239 and opposing side walls 235, 243 generally have a cooperative shape that corresponds to a shape of the receiver 223 (i.e., rectangular). Portions of the receiver 223 and transmitter 227 responsible for collecting echoes or transmitting acoustic beams, respectively, are unobstructed by the walls.

It should be noted that the set of walls may include any number of walls depending on the level of protection desired and the anticipated impact forces to be encountered. For example, in some embodiments, a given transducer module may only encounter side and/or front-facing impacts due to the location of its placement on the vessel and/or the type of activity with which the given vessel is associated with. Accordingly, in such an embodiment, the housing may only include two side walls to thereby provide protection for side and/or front-facing impacts. In other embodiments, a given transducer module may only encounter top and/or bottom impacts, and, as such the housing may only include top and bottom walls to provide corresponding protection. Yet still, in other embodiments, a given transducer module may encounter all directions of impact (i.e., side, front facing, top and/or bottom impacts), and, as such the housing may include side, top, and bottom walls to provide corresponding protection, as shown in FIG. 6.

In addition to protecting against impact forces, the two-piece protective assembly further protects against abrasive forces. For example, is common for the anchor chain to accidentally rub across the bow of a vessel. When this happens, the chain is taught and can act like a saw against a soft material, such as urethane. Without rigid protecting structures, the chain could further cut into the transducer elements. In the case where a chain, cable, or line is pulled across the face of a transducer module with the internal protection structure, namely the set of walls described herein, the depth of cut would be limited in most cases to the furthest extent of the walls. This would allow for the repair of the urethane face without the need to repair the transducer elements. Ideally, the transducer elements should be recessed relative to the protective structures by a recess distance 251 of at least the "tooth length" of the object acting like a saw. In the case of a chain (such as anchor chain scraping across the bow of a vessel), the "tooth length" is approximately: ("outside width"−"wire diameter")/2, where "outside width" and "wire diameter are commonly defined per the DIN 766 Windlass Chain Specification. Maximum protection can be achieved with a protection structure (i.e., cavity formed by walls or projections) that completely surrounds the transducer elements. Again, the strength of the cavity (i.e., the walls or projections forming the cavity) should be designed based on the maximum impact force expected and the cavity should be rigidly mated to the rest of the transducer module's housing.

Figure 7:
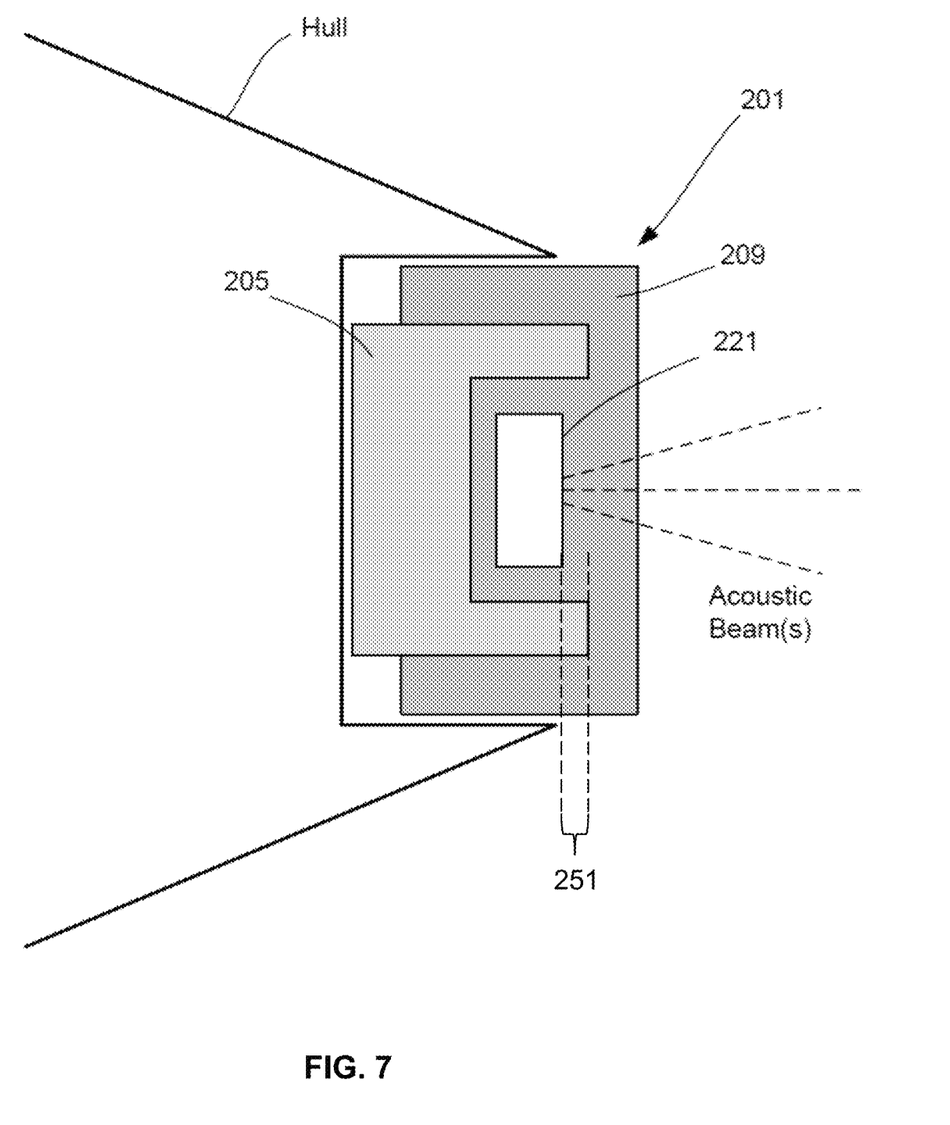
FIG. 7 is a plan, sectional view showing a transducer module of the present invention coupled to a hull of a marine vessel.

FIG. 7 is a plan, sectional view showing a transducer module 201 coupled to a hull of a marine vessel. As illustrated, the cover 209 is completely overmolded and coupled to the housing 205, thereby improved bonding of urethane to the one or more transducer elements 221 and the housing 205 itself, forming a tight seal and providing protection against multiple directions of impact (i.e., side impacts and front-facing impacts) in cooperation with the internal housing 205. Again, the set of walls may generally include two or more walls, arranged in such a manner so as to enclose respective portions of the one or more transducer elements within while remaining outside of a field of view of the transducer elements (i.e., not obstruct acoustic beams or receipt of reflected beams).

Figure 8:
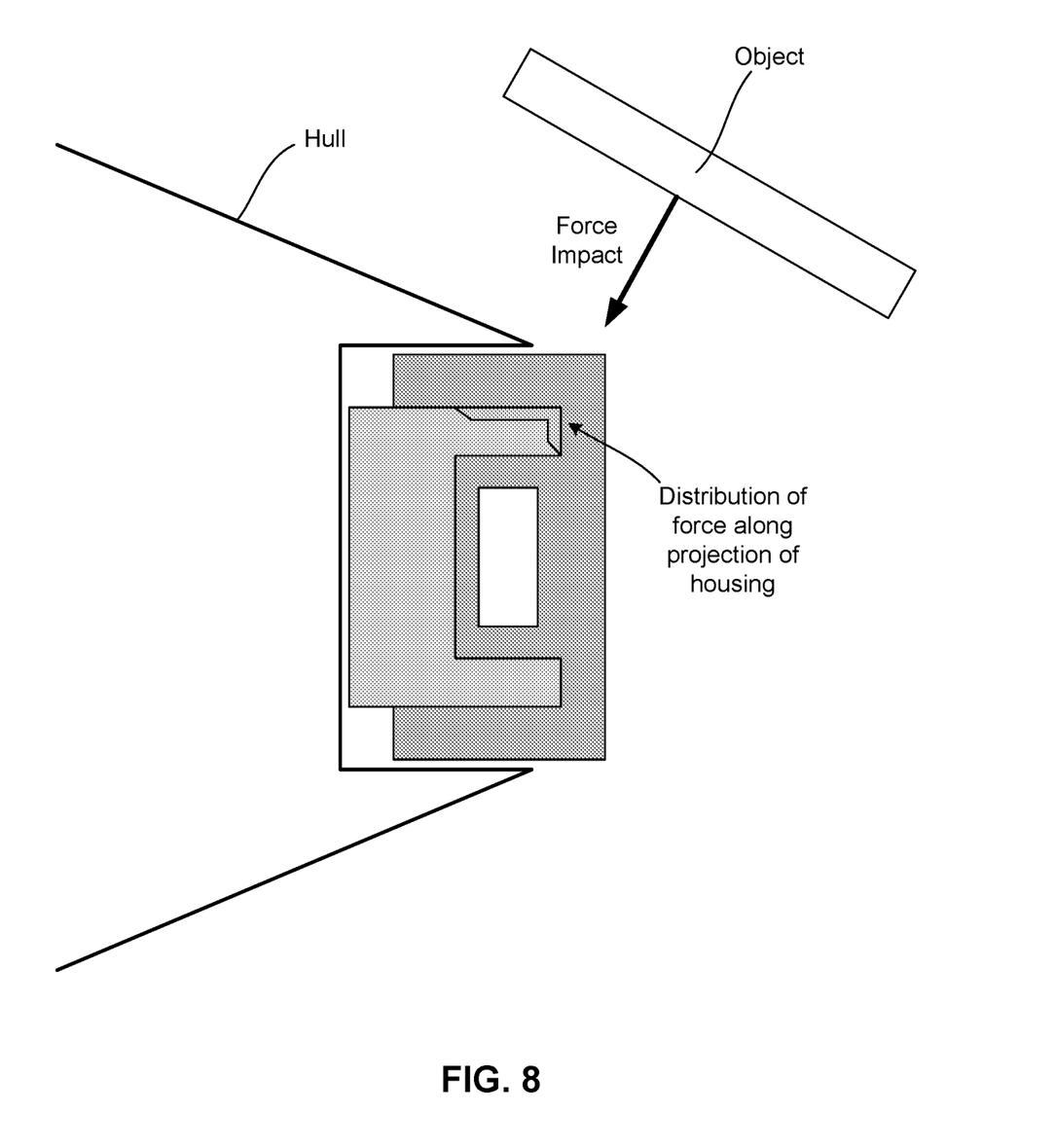
FIG. 8 is a plan, sectional view illustrating a side impact upon the transducer module.
Figure 9:
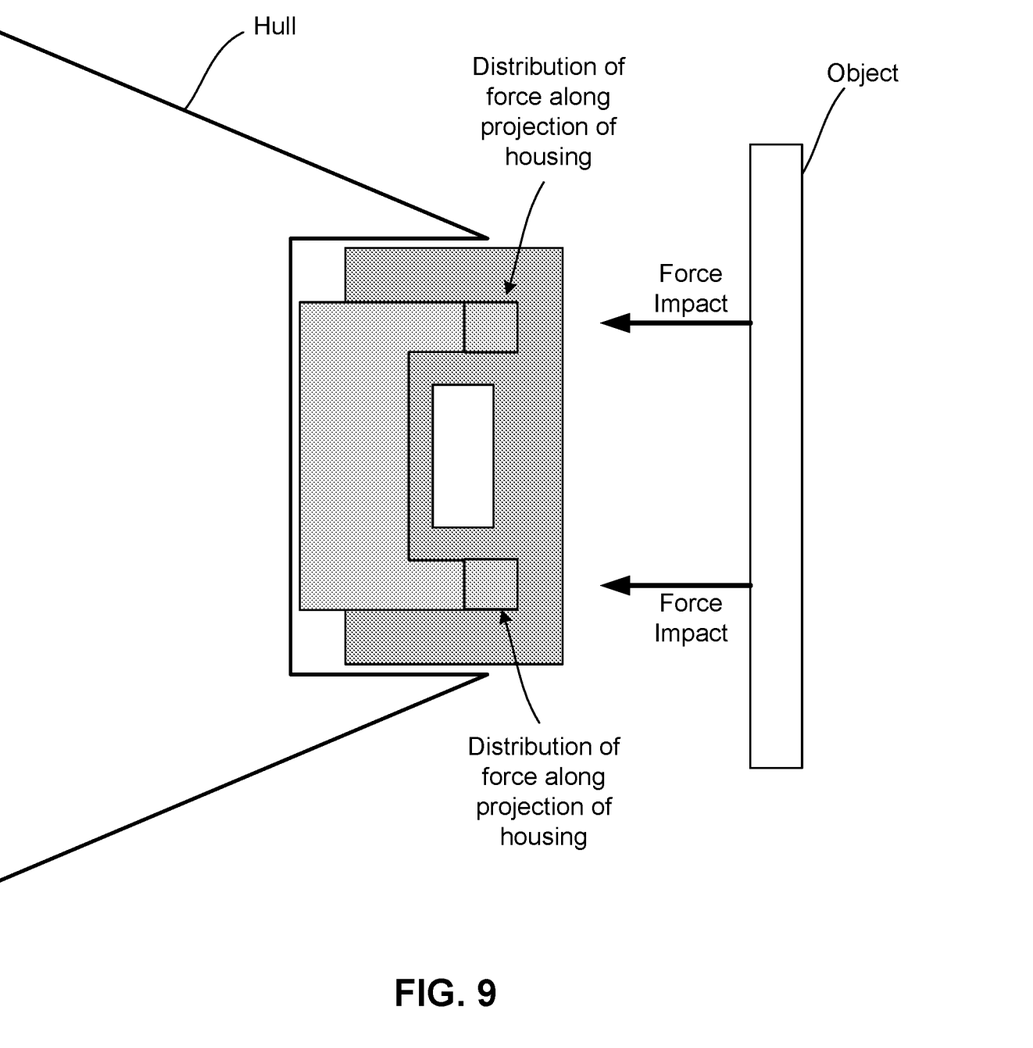
FIG. 9 is a plan, sectional view illustrating a front-facing impact upon the transducer module.

FIG. 8 is a plan, sectional view illustrating a side impact upon the transducer module 201. FIG. 9 is a plan, sectional view illustrating a front-facing impact upon the transducer module. As illustrated, upon sustaining a side impact or front facing impact from an object (i.e., another vessel, dock, rock, iceberg, sea life, etc.), the arrangement of the walls or projections of the internal housing 205 reduces the possibility of compressing the urethane and transferring the impact force to the transducer elements. In the event that the impact is severe enough to damage the urethane, the cover 209 can either be fixed or entirely replaced, while the costly and highly sensitive transducer elements 221 are saved.

The transducer module of the present invention addresses the drawbacks of current protection mechanisms. The two-piece protective assembly allows for the transducer module to be a standalone module that does not require a custom recess to be provided in the structure of a vessel. In other words, the transducer module is a hull-mountable device, configured to be directly mounted to an exterior of a vessel's hull and thus does not rely on the vessel for protection from impacts. Rather, the internal rigid housing provides protection similar to that of a vessel's structure. Furthermore, overmolding the urethane cover allows for improved bonding of urethane to the one or more transducer elements and the housing itself, forming a tight seal and providing protection against multiple directions of impact (i.e., side impacts and front-facing impacts) in cooperation with the internal housing. In particular, the arrangement of the walls or projections of the internal housing reduces the possibility of compressing the urethane and damaging the transducer elements.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A sonar transducer module comprising:
   an internal housing comprising a cavity defined by a set of walls extending from a rear portion thereof;
   one or more transducer elements provided within the cavity of the housing, each transducer element recessed a recess distance behind a protective structure of the set of walls, wherein the sonar transducer module is installed on a vessel and the recess distance is at least a length of a dimension of an anchor chain on the vessel; and
   a cover overmolded and coupled to the internal housing and sealing the one or more transducer elements within the cavity of the internal housing.

2. The sonar transducer module of claim 1, wherein the set of walls are arranged to protect portions of the one or more transducer elements without obstructing a forward-looking field of view of the one or more transducer elements.

3. The sonar transducer module of claim 2, wherein the set of walls consists of opposing side walls.

4. The sonar transducer module of claim 2, wherein the set of walls consists of opposing top and bottom walls.

5. The sonar transducer module of claim 1, wherein the set of walls comprises at least four walls.

6. The sonar transducer module of claim 5, wherein the at least four walls comprise opposing side walls and opposing top and bottom walls.

7. The sonar transducer module of claim 6, wherein a first portion of the cavity defined, at least in part, by the top wall is shaped to correspond to a shape of a transmitter transducer element without obstructing a field of view of the transmitter transducer element.

8. The sonar transducer module of claim 6, wherein a second portion of the cavity defined, at least in part, by the opposing side walls and bottom wall is shaped to correspond to a shape of a receiver transducer element without obstructing a field of view of the receiver transducer element.

9. The sonar transducer module of claim 1, wherein the internal housing comprises a marine grade material.

10. The sonar transducer module of claim 9, wherein the marine grade material comprises a duplex stainless steel.

11. The sonar transducer module of claim 10, wherein the duplex stainless steel comprises SAE 316 or SAE 316L grade stainless steel.

12. The sonar transducer module of claim 1, wherein the cover comprises a marine grade material capable of undergoing an overmolding process.

13. The sonar transducer module of claim 12, wherein the cover comprises a material having an acoustic impedance substantially similar to water.

14. The sonar transducer module of claim 13, wherein the cover comprises a urethane material.

15. The sonar transducer module of claim 1, wherein the internal housing includes guides for receipt of corresponding mounting tools.

16. The sonar transducer module of claim 1, wherein the set of walls comprise only two side walls.

17. The sonar transducer module of claim 1, wherein the module is sized to fit into a pre-formed recess disposed on a vessel.

18. The sonar transducer module of claim 1, wherein the module is installed on a bow of a vessel and the transducer module includes forward-looking capabilities.

* * * * *